US008639296B2

(12) United States Patent
Ahn et al.

(10) Patent No.: US 8,639,296 B2
(45) Date of Patent: Jan. 28, 2014

(54) MOBILE DEVICE AND AN IMAGE DISPLAY METHOD THEREOF

(75) Inventors: Soogil Ahn, Gunpo (KR); Hyungjin Bang, Seoul (KR)

(73) Assignee: LG Electronics Inc., Seoul (KR)

( * ) Notice: Subject to any disclaimer, the term of this patent is extended or adjusted under 35 U.S.C. 154(b) by 238 days.

(21) Appl. No.: 13/158,324

(22) Filed: Jun. 10, 2011

(65) Prior Publication Data

US 2012/0315954 A1   Dec. 13, 2012

Related U.S. Application Data

(60) Provisional application No. 61/494,361, filed on Jun. 7, 2011.

(51) Int. Cl.
*H04M 1/00* (2006.01)
*H04M 1/725* (2006.01)

(52) U.S. Cl.
CPC ...... *H04M 1/72519* (2013.01); *H04M 1/72583* (2013.01)
USPC .............. 455/566; 345/173; 345/557; 396/85

(58) Field of Classification Search
USPC .................. 455/566; 396/85; 345/173, 557
See application file for complete search history.

(56) References Cited

U.S. PATENT DOCUMENTS

| 5,602,984 A * | 2/1997 | Mieras .......................... 345/557 |
| 5,923,908 A * | 7/1999 | Schrock et al. .................. 396/85 |
| 2008/0174570 A1* | 7/2008 | Jobs et al. ...................... 345/173 |

OTHER PUBLICATIONS

Kodak Easyshare C182, Digital Camera, Extended User Guide, 2009.*

* cited by examiner

*Primary Examiner* — William D Cumming
(74) *Attorney, Agent, or Firm* — Lee, Hong, Degerman, Kang & Waimey

(57) ABSTRACT

According to one embodiment, a method includes: displaying an image in an orientation of an image capturing device associated with the mobile device rendered during a capture of the image; providing a user interface configured to process a user input for reorienting the image into a second orientation by displaying a thumbnail image of the image and a graphical user interface in a shape of a wheel surrounding the thumbnail image and rotating the thumbnail image to the second orientation when the user input is applied to the graphical user interface in the shape of the wheel to a degree of rotation corresponding to the second orientation; and displaying the image into the second orientation in response to the user input by reorienting the image in the second orientation when the user input applied to the graphical user interface in the shape of the wheel is released.

17 Claims, 16 Drawing Sheets

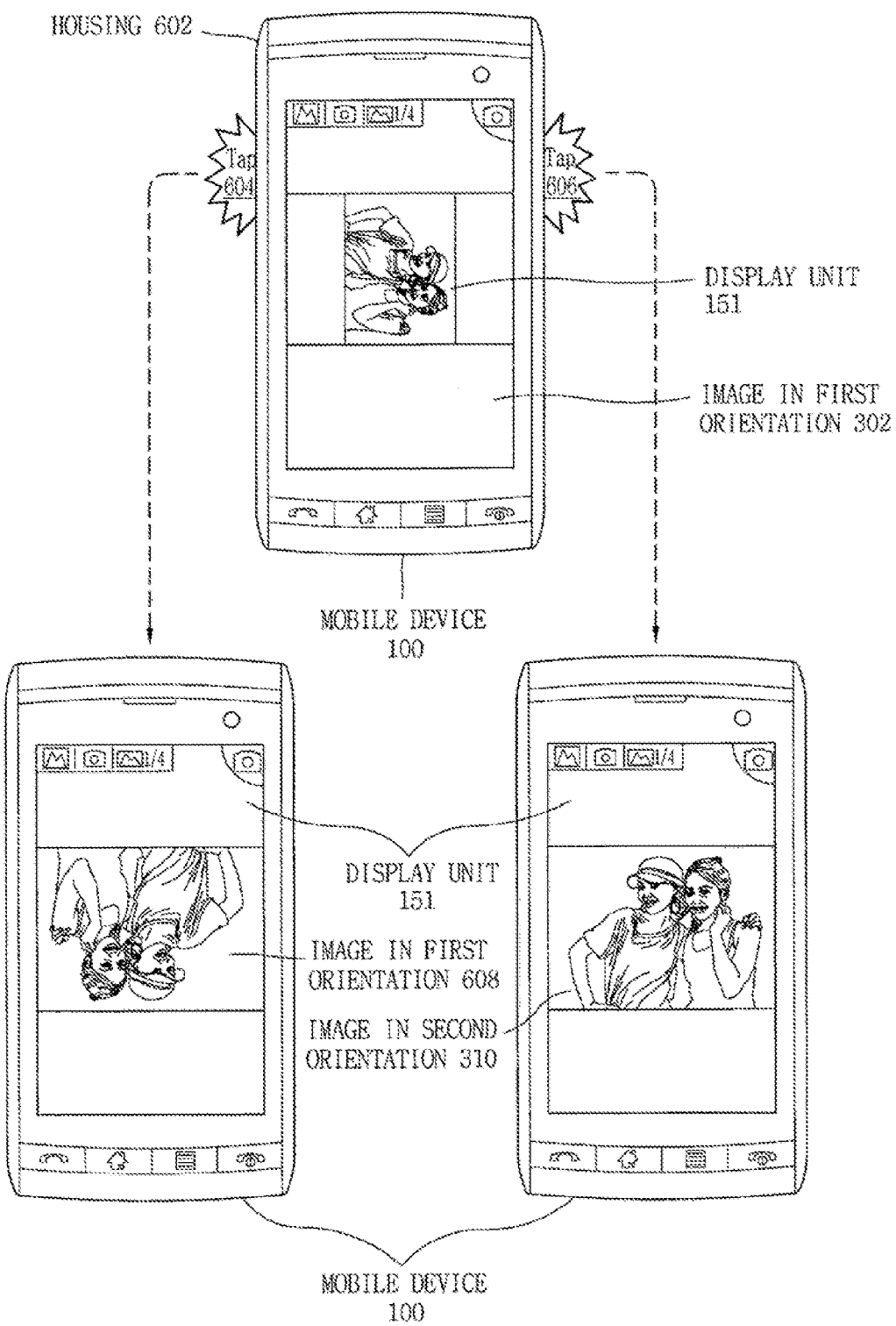

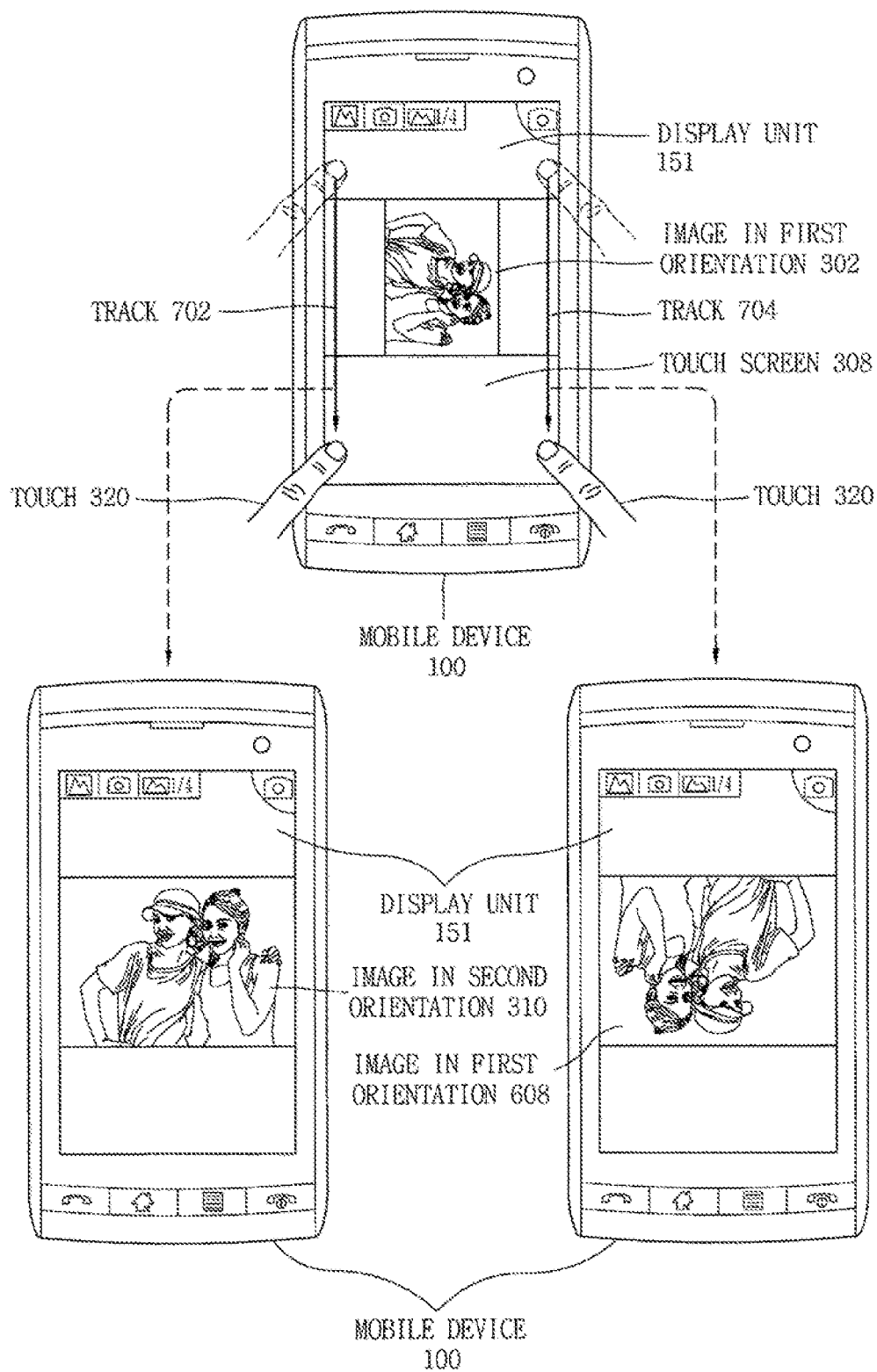

MOBILE DEVICE AND AN IMAGE DISPLAY METHOD THEREOF

CROSS-REFERENCE TO RELATED APPLICATIONS

Pursuant to 35 U.S.C. §119(e), this application claims the benefit U.S. Provisional Patent Application Ser. No. 61/494,361, filed on Jun. 7, 2011, the contents of which are hereby incorporated by reference herein in their entirety.

TECHNICAL FIELD

The present disclosure relates to a method for displaying a captured image, and an apparatus implementing the same.

BACKGROUND

A digital camera is a camera that takes a still photograph or moving videos by recording images using electronic image sensors, such as CCD, CMOS, Foveon, or others. The digital camera may record thousands of such images in a memory device, and display the images immediately after they are taken. In addition, some or all of the images may be deleted to free space in the memory device.

Mobile devices are devices which may be configured to perform various functions. Examples of such functions include data and voice communications, recording audio, playing music files via a speaker system, and displaying images and videos on a display unit. Nowadays, the function of capturing images and video via the digital camera is commonly implemented on the mobile devices.

SUMMARY

This summary is provided to comply with 37 C.F.R. §1.73, requiring a summary of the disclosure briefly indicating the nature and substance of the disclosure. It is submitted with the understanding that it will not be used to interpret or limit the scope or meaning of the claims.

Systems, circuits, and devices for displaying a captured image are disclosed. In one aspect, a mobile device includes a memory; a display unit, an input device, and a processor coupled to the memory, the display unit and the input device, where the processor is configured to display an image in a first orientation (e.g., an orientation of an image capturing device rendered during a capture of the image) irrespective of an orientation of the display unit when the image is accessed for displaying on the display unit. The processor is further configured to provide a user interface configured to process a user input for reorienting the image into a second orientation and display the image in the second orientation in response to the user input.

In another aspect, a method of a mobile device includes displaying an image in a first orientation irrespective of an orientation of a display unit of the mobile device when the image is accessed for displaying on the display unit, where the first orientation is an orientation of an image capturing device associated with the mobile device rendered during a capture of the image. The method further includes providing a user interface configured to process a user input for reorienting the image into a second orientation, and displaying the image in the second orientation in response to the user input.

In yet another aspect, a mobile device includes a cache memory, a display unit, an input device, a cache, and a processor coupled to the memory, the display unit and the input device, where the processor is configured to display an image in a first orientation irrespective of an orientation of the display unit when the image is accessed for displaying on the display unit. The processor is also configured to provide a user interface configured to process a user input for reorienting the image into a second orientation, and display the image in the second orientation in response to the user input. The processor is further configured to store the image in the second orientation in the cache memory, and display the image in the second orientation by accessing the image in the second orientation from the cache memory in response to a subsequent user input accessing the image.

Other features of the embodiments will be apparent from the accompanying drawings and from the detailed description that follows.

BRIEF DESCRIPTION OF THE VIEWS OF DRAWINGS

Example embodiments are illustrated by way of example and not limitation in the figures of the accompanying drawings, in which like references indicate similar elements and in which:

FIGS. 6A-6B illustrate the fourth exemplary view of the image being reoriented by a user input, according to one embodiment.

FIGS. 7A-7B illustrate the fifth exemplary view of the image being reoriented by a user input, according to one embodiment.

Figure 1:
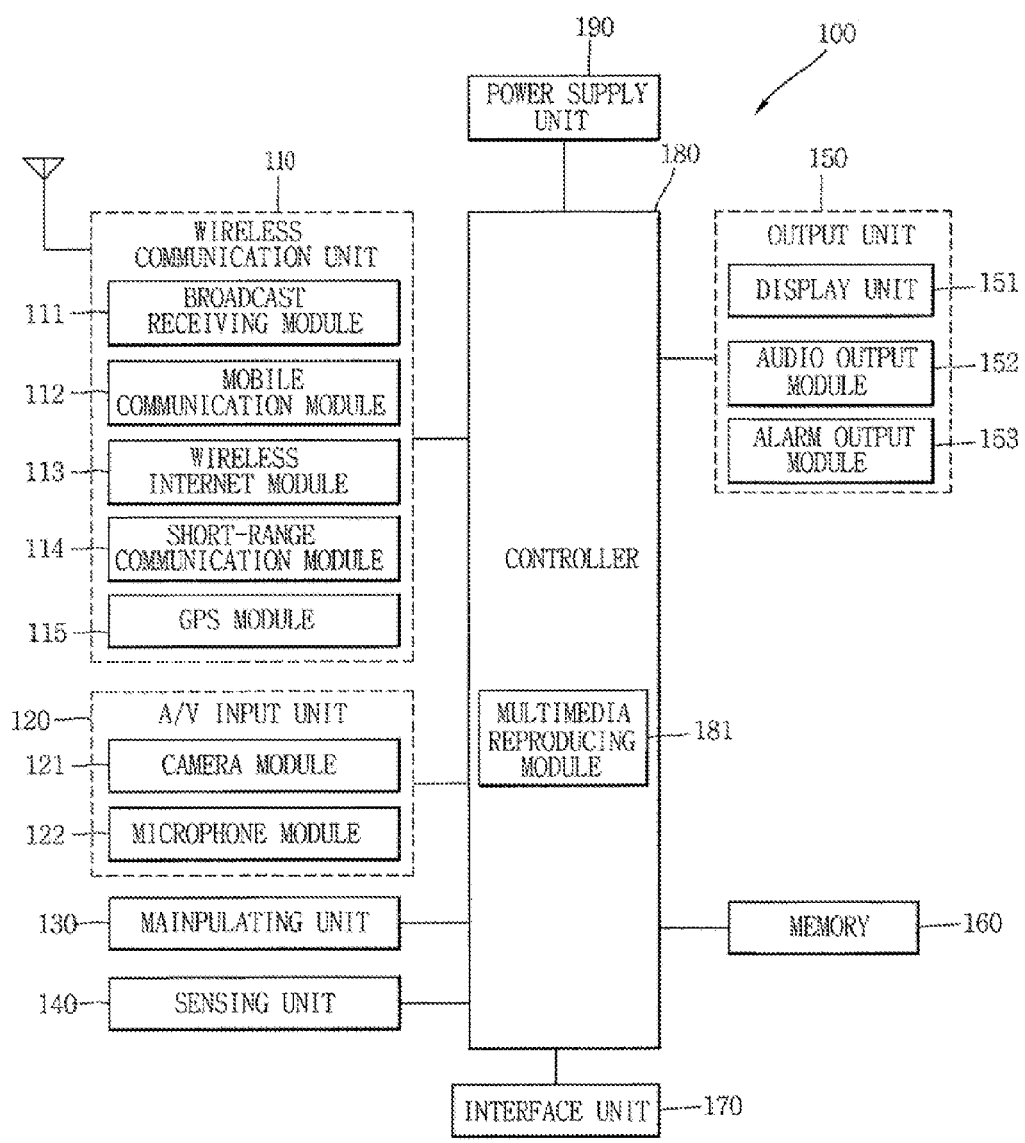
FIG. 1 illustrates an exemplary mobile device 100, according to one embodiment.

Other features of the present embodiments will be apparent from the accompanying drawings and from the detailed description that follows. Further, the drawings described herein are for illustration purposes only and are not intended to limit the scope of the present disclosure in any way.

DETAILED DESCRIPTION

A method, device and/or system that display a captured image on a mobile device are disclosed. According to embodiments of this disclosure, devices, systems, and methods render a user interface, such as a graphical user interface, a touch screen, an acceleration sensor, and so on, which allows a reorientation of a captured image displayed on a mobile device. Currently, a majority of mobile devices or their cameras include a feature which automatically reorients the captured and/or stored image according to the current orientation of the mobile devices displaying the captured image. For instance, if the image was captured in the upright portrait orientation and the orientation of the mobile device accessing the captured image is in the upright landscape orientation, the captured image in the portrait orientation is reoriented to the landscape orientation for display. However, the user may not like this feature since the user might have captured the image in his or her preferred orientation (e.g., the portrait orientation) at the time of the image capture. Thus, the user may not like the feature of automatically displaying the image in the landscape orientation by default just because the mobile device currently displaying the image happens to be in that particular orientation.

Accordingly, the embodiments of the present disclosure provides a number of devices, systems, and/or methods which display the captured image according to the orientation set at the time of the image capture, and then providing a number of user interfaces which allow the user to reorient the captured image at the choosing of the user. Thus, the embodiments include more versatile, efficient methods, systems, and devices for displaying captured images on the mobile device.

Reference will now be made in detail to the embodiments of the disclosure, examples of which are illustrated in the accompanying drawings. While the disclosure will be described in conjunction with the embodiments, it will be understood that they are not intended to limit the disclosure to these embodiments. On the contrary, the disclosure is intended to cover alternatives, modifications and equivalents, which may be included within the spirit and scope of the disclosure. Furthermore, in the detailed description, numerous specific details are set forth in order to provide a thorough understanding of the present disclosure. However, it will be obvious to one of ordinary skill in the art that the present disclosure may be practiced without these specific details. In other instances, well known methods, procedures, components, and circuits have not been described in detail as not to unnecessarily obscure aspects of the present disclosure.

FIG. 1 illustrates an exemplary mobile device 100, according to one embodiment. Referring to FIG. 1, the mobile device 100 according to one embodiment may be implemented in various configurations or form factors. Examples of such terminals include mobile phones, smart phones, notebook computers, navigation devices, digital broadcast terminals, personal digital assistants (PDAs), or portable multimedia players (PMP). The mobile device 100 may include a wireless communication unit 110, an A/V (Audio/Video) input unit 120, a manipulating unit 130, a sensing unit 140, an output unit 150, a storage unit 160, an interface unit 170, a controller 180, and a power supply unit 190, etc. Greater or fewer components may alternatively be implemented.

For example, the wireless communication unit 110 may include a broadcast receiving module 111, a mobile communication module 112, a wireless Internet module 113, a short-range communication module 114, and a GPS module 115. The broadcast receiving module 111 receives a broadcast signal and/or broadcast associated information from an external broadcast management server via a broadcast channel. The broadcast channel may include a satellite channel and a terrestrial channel. The broadcast managing server may refer to a system that generates and transmits a broadcast signal and/or broadcast associated information or a server that receives a previously generated broadcast signal and/or broadcast associated information and transmits the same to a terminal.

Examples of the broadcast associated information may include information regarding a broadcast channel, a broadcast program, a broadcast service provider, etc. The broadcast signal may include a TV broadcast signal, a radio broadcast signal, and a data broadcast signal, among others. If desired, the broadcast signal may further include a broadcast signal combined with a TV or radio broadcast signal. The broadcast associated information may be provided also via a mobile communication network and, in this case, the broadcast associated information may be received by the mobile communication module 112. The broadcast signal may exist in various forms. For example, it may exist in the form of an electronic program guide (EPG) of digital multimedia broadcasting (DMB), electronic service guide (ESG) of digital video broadcast-handheld (DVB-H), etc.

The broadcast receiving module 111 may be configured to receive broadcast signals by using various types of broadcast systems. In particular, the broadcast receiving module 111 may receive a digital broadcast signal by using a digital broadcast system such as multimedia broadcasting-terrestrial (DMB-T), digital multimedia broadcasting-satellite (DMB-S), digital video broadcast-handheld (DVB-H), the data broadcasting system known as media forward link (Media-FLO®), integrated services digital broadcast-terrestrial (ISDB-T), etc. The broadcast receiving module 111 is configured to be suitable for every broadcast system that provides a broadcast signal as well as the above-mentioned digital broadcast systems. Broadcast signal and/or broadcast-associated information received via the broadcast receiving module 111 may be stored in the storage unit 160.

The mobile communication module 112 transmits/receives radio signals to/from at least one of a base station, an external terminal and a server in a mobile communication network. Such radio signals may include a voice call signal, a video call signal or various types of data according to text/multimedia message transmission/reception. The wireless Internet module 113 supports Internet access for the mobile device 100, and may be internally or externally coupled to the mobile device 100. The short-range communication module 114 refers to a module for supporting short range communications. Some examples of short-range communication technology include Bluetooth™, Radio Frequency IDentification (RFID), Infrared Data Association (IrDA), Ultra-WideBand (UWB), ZigBee™, and the functional or structural equivalents.

The GPS module 115 is a module receives location information from a plurality of artificial satellites. AN input unit 120 is configured to input an audio or video signal. The A/V input unit 120 may include a camera module 121 and a microphone module 122. The camera module 121 processes image frames of still pictures or videos obtained by an image sensor in a video capturing mode or an image capturing mode. The processed image frames may be displayed on a display module 151. The image frames processed by the camera module 121 may be stored in the memory 160 or transmitted via the wireless communication unit 110. Two or more camera modules 121 may be provided according to the configuration of the mobile device 100.

The microphone module 122 may receive sounds (e.g., audible data) via a microphone in a phone call mode, a recording mode, a voice recognition mode, and the like, and process it into electrical voice data. The processed audio (voice) data may be converted for output into a format transmittable to a mobile communication base station via the mobile communication module 112 in case of the phone call mode. The microphone module 122 may include various types of noise canceling (or suppression) algorithms to cancel (or suppress) noise generated in the course of receiving and transmitting audio signals.

The manipulating unit 130 may generate key input data inputted by a user to control various operations of the mobile device 100. The manipulating unit 130 may include a keypad, a dome switch, a touch pad (e.g., a touch sensitive member that detects changes in resistance, pressure, capacitance, etc.), a jog wheel, a jog switch, and the like. In particular, when the touch pad is overlaid on the display module 151 in a layered manner, it may be called a touch screen.

The sensing unit 140 detects a current status (or state) of the mobile device 100 such as an open/close state of the mobile device 100, a location of the mobile device 100, a presence or absence of user contact with the mobile device 100, and generates commands or signals for controlling the operation of the mobile device 100. For example, when the mobile device 100 is a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The interface unit 170 serves as an interface with at least one external device connected with the mobile device 100. For example, the external devices may include wired/wireless headset ports, external power charger ports, wired/wireless data ports, memory card ports, ports for connecting a device having an identification module (e.g., SIM/UIM/UICC card), audio input/output (I/O) ports, video I/O ports, earphone ports, or the like. The interface unit 170 may be used to receive inputs (e.g., data, information, power, etc.) from an external device and transfer the received inputs to one or more elements within the mobile device 100 or may be used to transfer data from the mobile device 100 to an external device.

The output unit 150 is configured to output an audio signal, a video signal or an alarm signal. The output unit 150 may include the display module 151, an audio output module 152, an alarm output module 153, and the like. The display module 151 may output information processed in the mobile device 100. For example, when the mobile device 100 is in the phone call mode, the display unit 151 may display a User Interface (UI) or a Graphic User Interface (GUI) associated with a call or other communication. When the mobile device 100 is in the video call mode or the image capturing mode, the display unit 151 may display a captured and/or received image, a UI, a GUI, and the like.

When the display module 151 and the touch pad are overlaid in a layered manner to form a touch screen, the display module 151 may function as both an input device and an output device. The display module 151 may include at least one of a Liquid Crystal Display (LCD), a Thin Film Transistor-LCD (TFT-LCD), an Organic Light Emitting Diode (OLED), a flexible display, a three-dimensional (3D) display, for example. The mobile device 100 may include two or more display modules (or other display means) according to its embodiment. For example, the mobile device 100 may include an external display unit (not shown) and an internal display unit (not shown).

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed by the mobile device 100. The audio output module 152 may include a speaker, a buzzer, or the like. The alarm output module 153 may provide outputs to inform about an occurrence of an event of the mobile device 100. Typical events may include a call signal reception, a message reception, a key signal input, etc. In addition to audio or video outputs, the alarm output module 153 may provide outputs in a different manner to inform about an occurrence of an event.

For example, the alarm output module 153 may provide outputs in the form of vibrations (or other tactile means). When a call signal, a message, or some other incoming communication is received, the alarm output module 153 may provide tactile outputs (i.e., vibrations) to inform the user. By providing tactile outputs, the user can recognize the occurrence of various events. Outputs informing about the occurrence of an event may be also provided via the display unit 151 or the audio output module 152. The storage unit 160 may store software programs or the like used for the processing and controlling performed by the controller 180, or may temporarily store inputted/outputted data (e.g., a phonebook, messages, still images, video, etc.).

The storage unit 160 may include at least one type of storage medium including a flash memory type, a hard disk type, a multimedia card type, a card-type memory (e.g., SD or DX memory, etc), a Random Access Memory (RAM), a Static Random Access Memory (SRAM), a Read-Only Memory (ROM), and the like. Also, the mobile device 100 may cooperate with a network storage device that performs the storage function of the memory 160 over a network connection. The controller 180 typically controls the general operations of the mobile device 100. For example, the controller 180 performs controlling and processing associated with voice calls, data communications, video calls, and the like. In addition, the controller 180 may include a multimedia reproducing module 181 for reproducing (or playing back) multimedia data. The multimedia reproducing module 181 may be configured within the controller 180 or may be configured to be separated from the controller 180.

The power supply unit 190 receives external or internal power and supplies power required for the operations of the respective elements under the control of the controller 180. It is appreciated that the mobile device 100 may be implemented in a variety of different configurations. Examples of such configurations include folder-type, bar-type, swing-type and slide type combinations thereof.

In one embodiment, the mobile device 100 includes the memory 160, the display unit 151, an input device (e.g., the A/V input unit 120, the manipulating unit 130, and/or the sensing unit 140), and a processor (e.g., the controller 180) coupled to the memory 160, the display unit 151 and the input device, where the processor is configured to display an image in a first orientation irrespective of an orientation of the display unit 151 or the mobile device 100 when the image is accessed for displaying on the display unit 151, wherein the first orientation is an orientation of an image capturing device rendered during a capture of the image. The processor is further configured to provide a user interface configured to process a user input for reorienting the image into a second orientation and display the image in the second orientation in response to the user input.

Figure 2A:
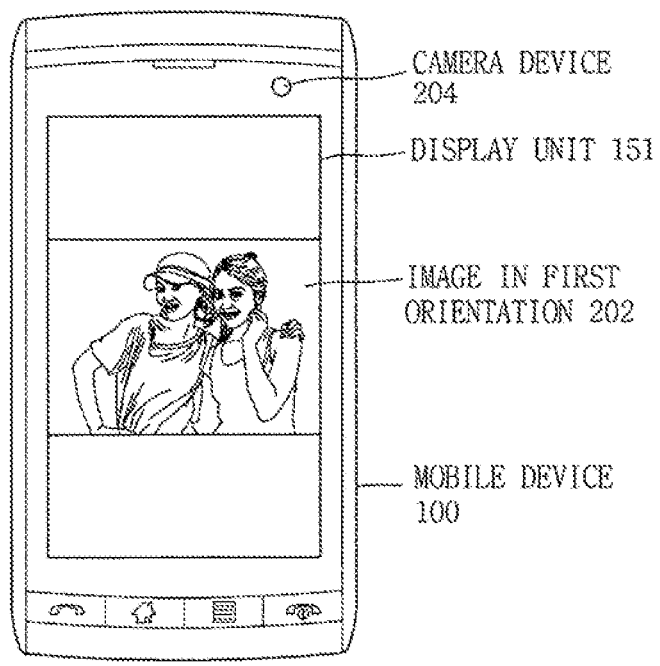
FIGS. 2A-2E illustrate an exemplary view of storing and displaying an image captured by a mobile device according to an orientation of the mobile device rendered at the time of the capture of the image, according to one embodiment.

FIGS. 2A-2E illustrate an exemplary view of storing and displaying an image captured by a mobile device 100 according to an orientation of the mobile device 100 at the time of the capture of the image, according to one embodiment. In FIG. 2A, an image in the first orientation 202 is captured by a camera device 204 of the mobile device 100, where the mobile device 100 is in a portrait orientation. It is appreciated that the image 202 may be captured by a camera of other device and forwarded to the mobile device 100. It is appreciated that the mobile device 100 may be in the portrait orientation, a landscape orientation, or an orientation in between (e.g., 40 degrees rotated from the portrait orientation). In one example implementation, the orientation information (e.g., the orientation tag value) of the image 202 may be stored in an EXIF. It is appreciated that the EXIF stands for Exchangeable Image File Format, and is a standard for storing interchange information in image files, especially those using JPEG compression. Most digital cameras now use the EXIF format. The format is part of the DCF standard created by JEITA to encourage interoperability between imaging devices. FIGS. 2B-2E illustrate storing and displaying of the image 202 as the image 202 was captured (e.g., irrespective of the orientation of the mobile device 100 currently displaying the image 202) when the captured image is being displayed subsequent to the image capture. That is, the gallery UI of the image 202 is kept according to the orientation of the mobile device 100 at the time of the image capture, but the current orientation of the mobile device 100 is disregarded.

Figure 2B:
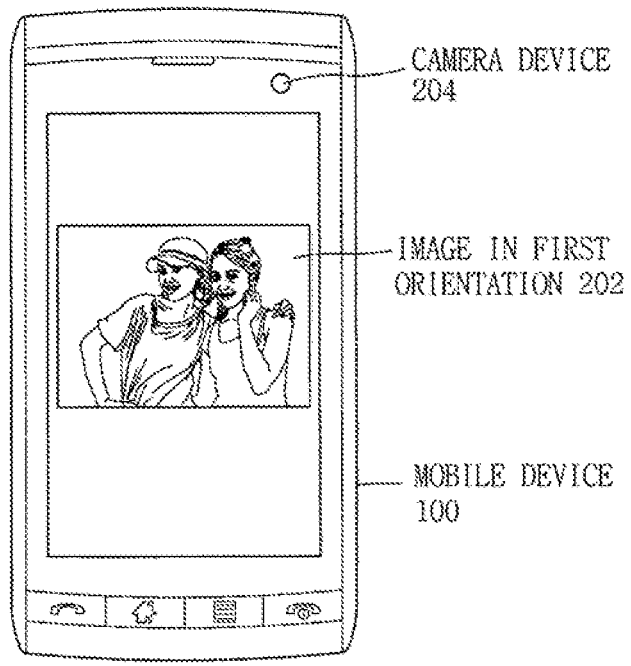
Figure 2C:
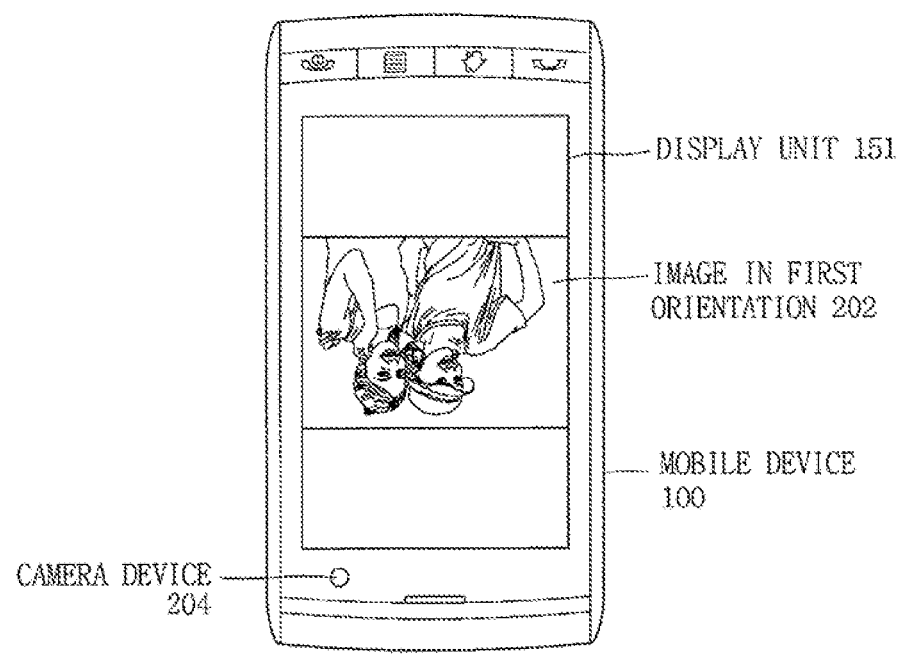
Figure 2D:
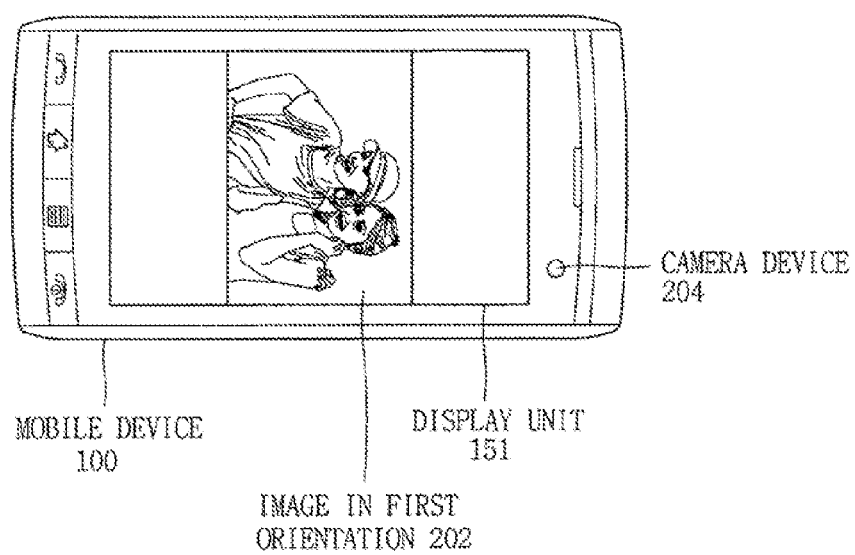
Figure 2E:
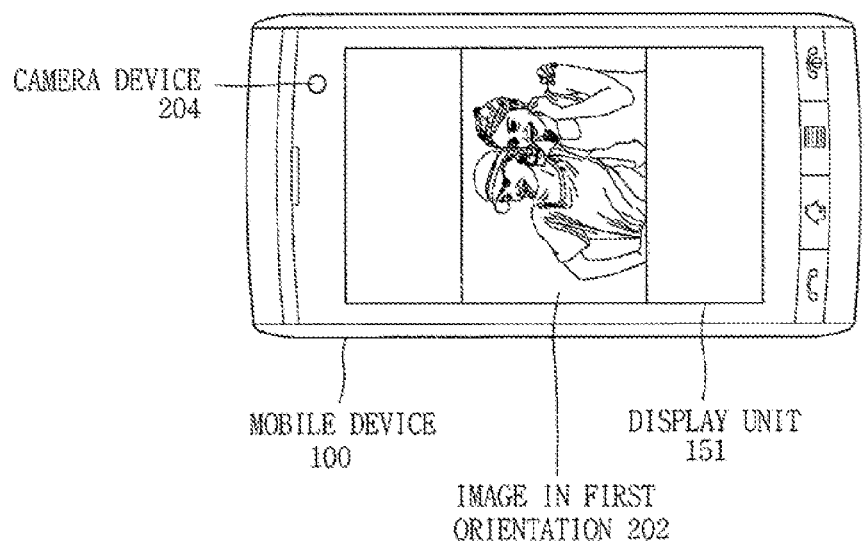

For example, in FIG. 2B, the image 202 is displayed as in FIG. 2A since the orientation of the mobile device 100 in FIG. 2B (e.g., the portrait orientation) is same as the orientation of the mobile device 100 when the image was captured, as in FIG. 2A. In FIG. 2C, the image 202 is upside down since the orientation of the mobile device 100 currently displaying the image 202 is upside down when compared to the orientation of the mobile device 100 rendered at the time of the image capture, as illustrated in FIG. 2A. In FIGS. 2D and 2E, the image 202 maintains the portrait orientation even though the orientation of the mobile device 100 is in the landscape orientation. In addition, the top of the image 202 is toward right in FIG. 2D to maintain the original orientation of the image 202 with respect to the orientation of the mobile device 100 (e.g., the upright portrait orientation) at the time of the image capture, whereas the top of the image 202 is toward left in FIG. 2E to maintain the original orientation of the image 202 with respect to the orientation of the mobile device 100 (e.g., the upright portrait orientation) at the time of the image capture.

In one embodiment, a thumbnail of the image 202 (e.g., a full screen image) may be displayed in the same orientation as the image 202. In one embodiment, besides the image 202 stored according to the orientation of the mobile device 100 at the time of the image capture, a resized image (e.g., reduced resolution) of the image 202 or original image may be stored as a cache file and accessed or processed subsequently. For example, when the user of the mobile device 100 first accesses a user interface to manipulate the image 202 first displayed on the mobile device 100 (e.g., according to the original orientation of the device 100 at the time of the image capture), and store the manipulated image (e.g., changed from the portrait orientation to the landscape orientation via the user interface as will be illustrated in the following figures) as a cache file to be used later. Thus, as long as the cache file of the manipulated image is available, the manipulated or reoriented image may be displayed when the image is accessed or called on to display by the user.

Figure 3A:
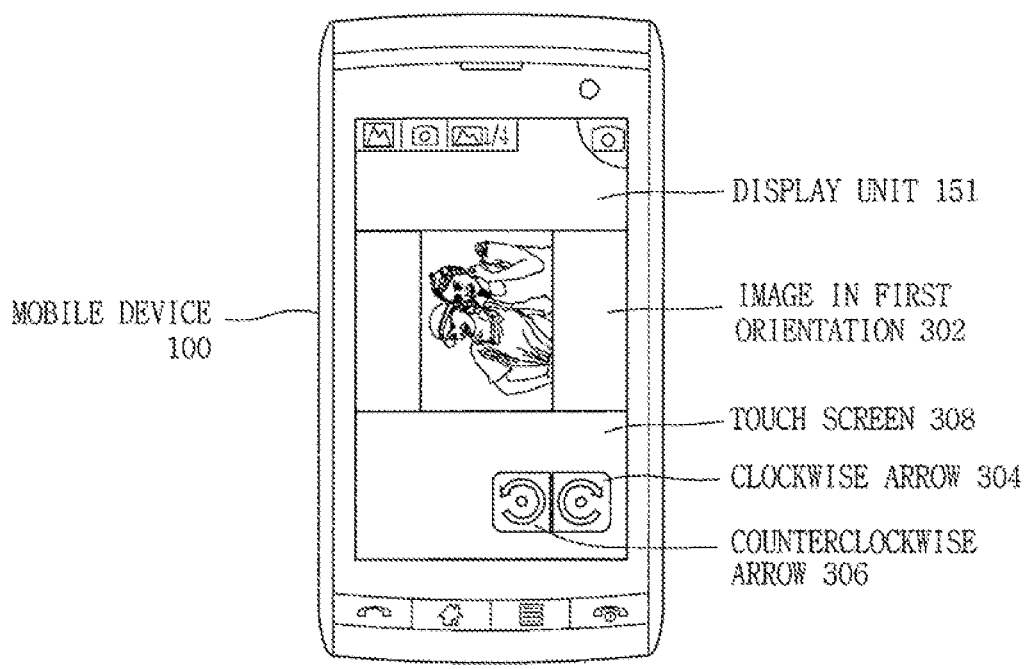
FIGS. 3A-3B illustrate the first exemplary view of the image being reoriented by a user input, according to one embodiment.
Figure 3B:
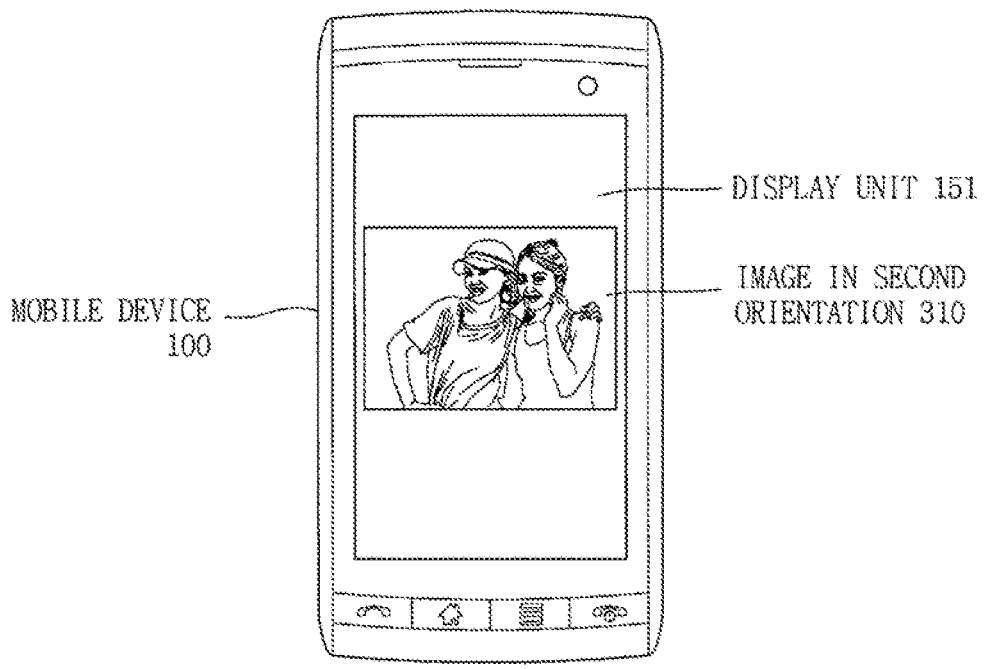

FIGS. 3A-3B illustrate the first exemplary view of an image in first orientation 302 being reoriented by a user input, according to one embodiment. In FIG. 3A, the image 302 or original image and one or more user interfaces (UIs) are displayed on the display unit 151. In addition, the mobile device 100 includes a touch screen 308 to process the user input applied on it. In one exemplary implementation, the UIs may include one or more graphical user interfaces, such as arrows (e.g., a clockwise arrow 304, a counterclockwise arrow 306, etc.) indicating the direction or rotating angle of the image being reoriented. Subsequently, when the user accesses one of the UIs to reorient the image in full screen, the image in full screen may be reoriented. As illustrated in FIG. 3B, through accessing the UI of the arrow indicating the clockwise direction, such as the clockwise arrow 304, the image in the landscape orientation (e.g., which may be the orientation of the device at the time of the image capture) may be reoriented to an image in the second orientation 310, which is in the portrait orientation.

Figure 4A:
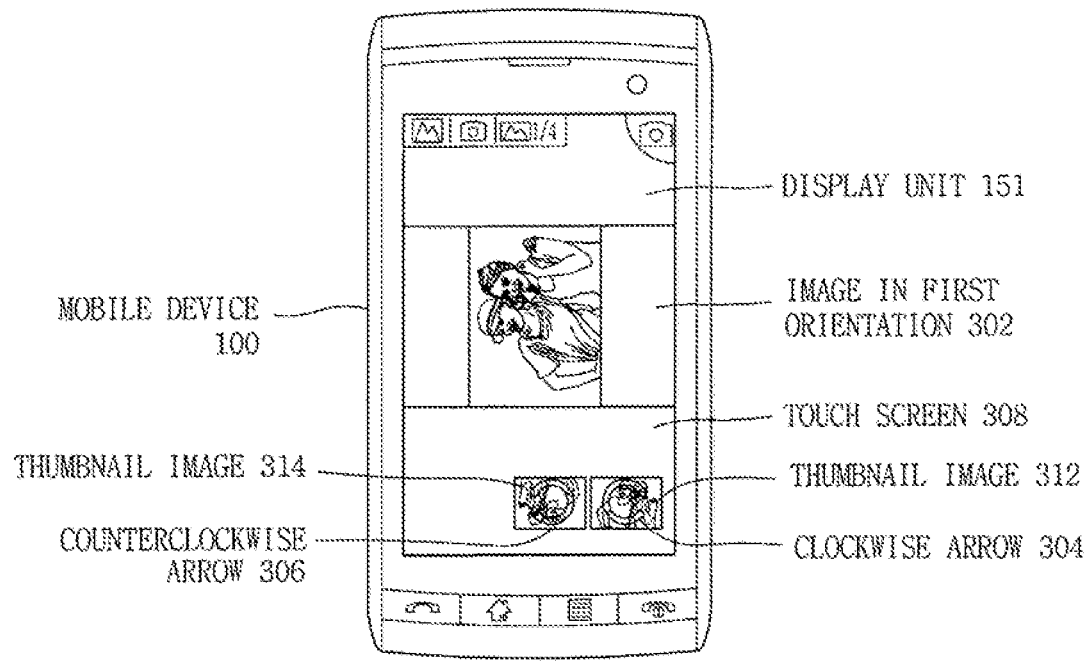
FIGS. 4A-4B illustrate the second exemplary view of the image being reoriented by a user input, according to one embodiment.
Figure 4B:
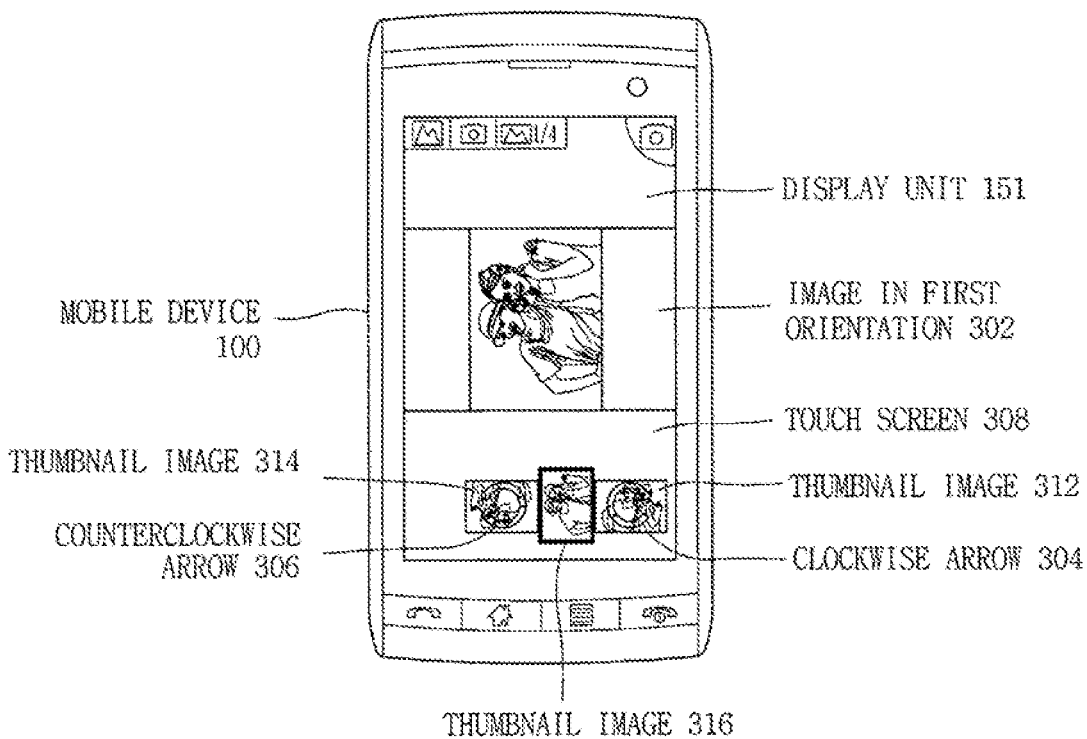

FIGS. 4A-4B illustrate the second exemplary view of the image 302 being reoriented by a user input, according to one embodiment. In FIG. 4A, the image 302 or original image and one or more user graphical interfaces (GUIs) are displayed. In one exemplary implementation, the GUIs may include one or more arrows (e.g., the clockwise arrow 304, the counterclockwise arrow 306, etc.) indicating the direction or rotating angle of the image 302 being reoriented. Further, each of the GUIs may also include the subsequent view of the full screen image should the full screen image is reoriented by accessing the particular GUI. For example, a thumbnail image 312 may be used to preview the subsequent orientation of the image in the first orientation 302 should the clockwise arrow 304 is accessed (e.g., touched) by the user. On the other hand, a thumbnail image 314 may be used to preview the subsequent orientation of the image 302 should the counterclockwise arrow 306 is accessed by the user.

As illustrated in FIG. 4A, the GUI with the counterclockwise arrow on the left comprises the thumbnail image of the full screen image rotated by 90 degrees counterclockwise direction (e.g., the subsequent image after the reorientation is applied). Further, the GUI with the clockwise arrow comprises a thumbnail image of the full screen image rotated by 90 degrees clockwise direction (e.g., the reoriented image). Subsequently, when the user accesses one of the GUIs to reorient the image 302 in full screen, the image 302 in full screen may be reoriented or rotated.

FIG. 4B illustrates an exemplary view of a thumbnail image 316 of the image 302 currently being displayed on the mobile device 100 with a highlighted periphery 318. The thumbnail images 312 and 314 on the left and right sides of the thumbnail image 316 may be similar to those GUIs illustrated in FIG. 4A.

Figure 5A:
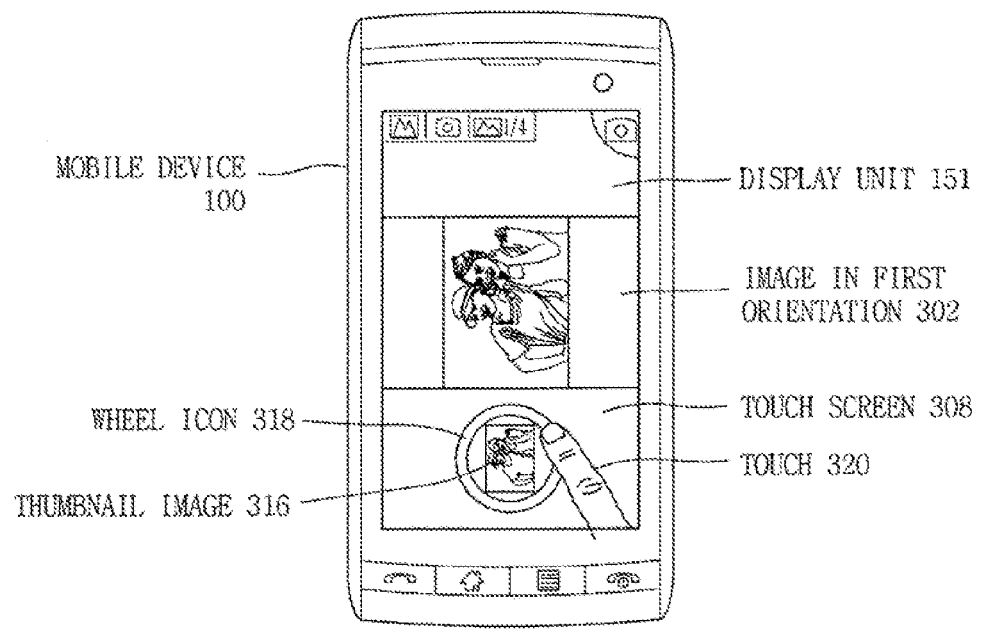
FIGS. 5A-5C illustrate the third exemplary view of the image being reoriented by a user input, according to one embodiment.
Figure 5B:
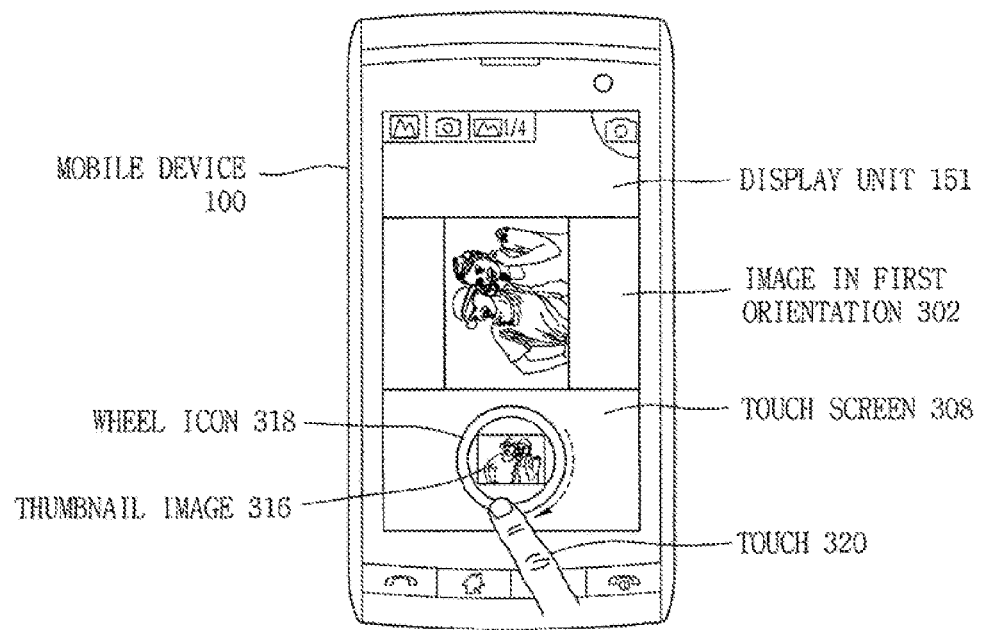
Figure 5C:
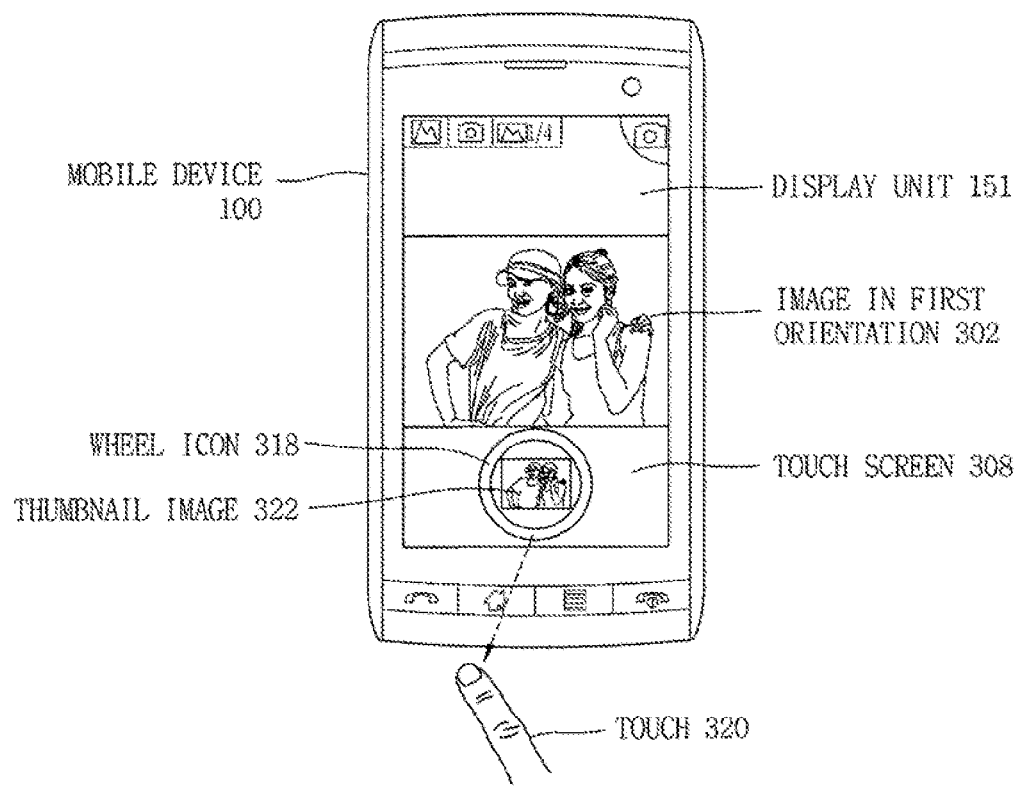

FIGS. 5A-5C illustrate the third exemplary view of the image being reoriented by a user input, according to one embodiment. FIG. 5A illustrates an exemplary view of a UI which allows the user to reorient or rotate the full screen image by accessing (e.g., touching, wheeling, dragging, gesturing, etc.) a GUI in the shape of a wheel (e.g., a wheel icon 318). In one exemplary implementation, as illustrated in FIG. 5B, as the user rotates the wheel icon 318 formed at the edge of the thumbnail image 316 of the full screen image 302, the thumbnail image 316 may be rotated into a thumbnail image 322 according to the degree of the rotation being applied on the wheel by a touch 320 or a finger, a stylus, etc. Then, as illustrated in FIG. 5C, upon release of the wheel icon 318, the full screen image 302 may be displayed in the rotated angle (e.g., the image in the second orientation 310). In another exemplary implementation, both the thumbnail image 316 and the full screen image 302 may be rotated at the same time as the wheel icon 318 is rotated, and both the thumbnail image 322 and full screen image 310 are set or reoriented as the user release the wheel icon 318.

Figure 6B:
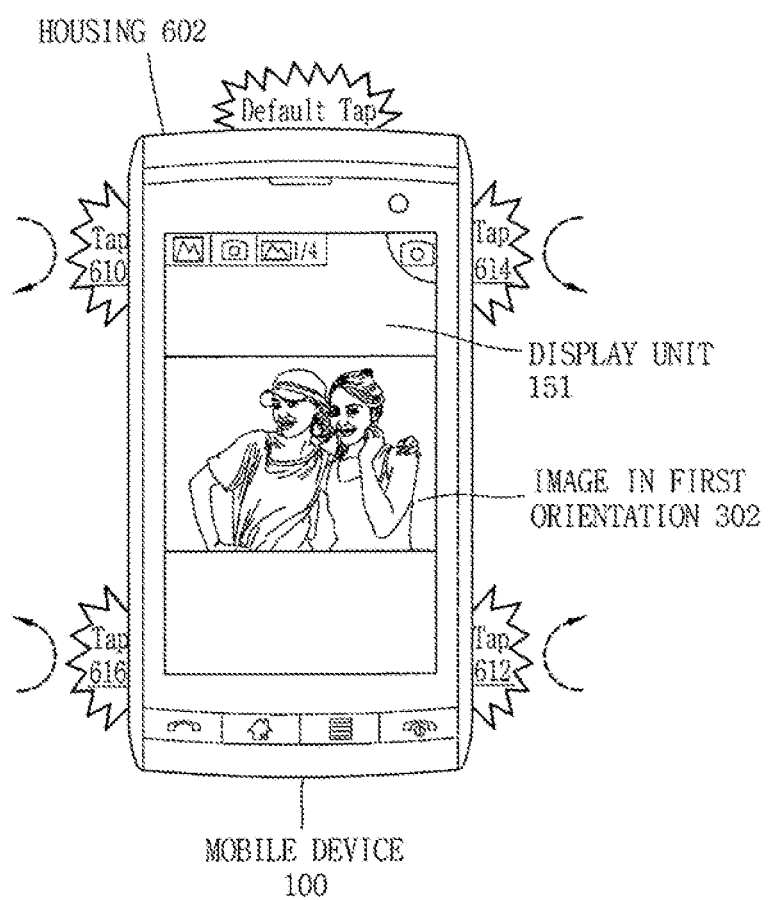

FIGS. 6A-6B illustrate the fourth exemplary view of the image 302 being reoriented by a user input, according to one embodiment. In FIG. 6A, the image 302 or full screen image may be reoriented when the user taps the sides (e.g., top, bottom, or back) of the mobile device 100. As illustrated in FIG. 6A, the original image 302 in the landscape orientation is reoriented to the upright portrait orientation (e.g., the image in the second orientation 310) as the user taps the right side of the mobile device 100. In one embodiment, the mobile device 100 may include an acceleration sensor or other type of sensor to determine a location of the user input in a form of tapping applied on a housing 602 of the mobile device 100. On the other hand, the original image 302 in the landscape orientation is reoriented to the upside down portrait orientation (e.g., an image in the third orientation 608) as the user taps the left side of the mobile device 100.

In FIG. 6B, the reorientation of the image 302, original image, or full screen image may be determined by the four different locations (e.g., the top left, top right, bottom right, or bottom left) tapped by the user. Thus, as the user taps the top left (e.g., a tap 610) or the bottom right (e.g., a tap 612), the image 302 may be reoriented 90 degrees in clockwise direction, whereas as the user taps the top right (e.g., a tap 614) or the bottom left (e.g., a tap 616), the image 302 may be reoriented 90 degrees in counterclockwise direction. Further, as the user applies a default tap (e.g., at the top center), the full screen image being reoriented or has been reoriented (e.g., the image 310 or the image 608) may return to the original image 302 or the orientation before the reorientation ever took place (e.g., during the current session). It is appreciated that there may be a various combinations of the tapping locations and the reorientation directions that can be realized via configuration of the mobile device 100. It is further realized that a similar function as discussed in this paragraph may be realized by varying a number of taps applied to the mobile device 100, such as one tap for reorienting 90 degrees clockwise, two taps for reorienting 90 degrees counterclockwise, and so on.

Figure 7B:
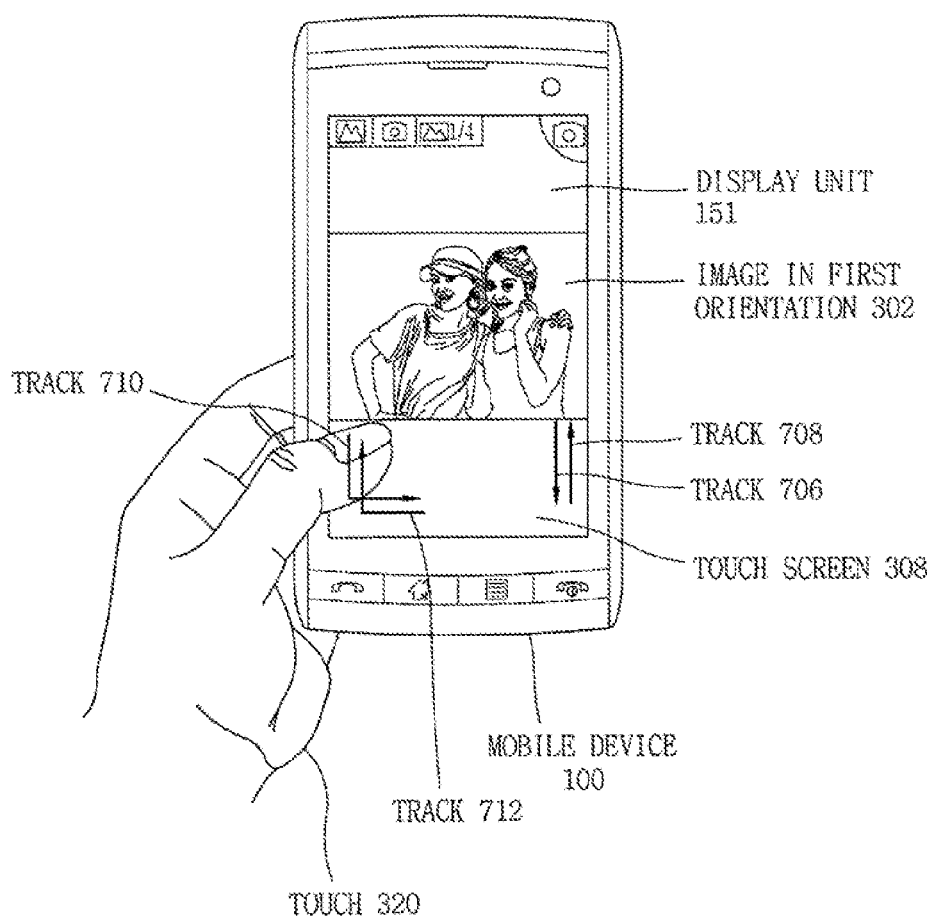

FIGS. 7A-7B illustrate the fifth exemplary view of the image 302 being reoriented by a user input, according to one embodiment. In FIG. 7A, the image 302 in full screen may be reoriented according to the user input. For instance, as the user drags on the right side (a track 702) of the image 302, the image 302 may be reoriented or rotated in counterclockwise direction. On the other hand, as the user drags on the left side (e.g., a track 704) of the image 302, the image 302 may be reoriented or rotated in clockwise direction. Although FIG. 7 illustrates the two tracks which represent the dragging routes by the user, the dragging may be conducted across the touch screen 308 (e.g., left and right) as well as toward the top. In FIG. 7B, the user may reorient the image 302 or full screen image using the thumb of the hand (e.g., the touch 320) which is holding or grabbing the mobile device 100. In one example implementation, the user may drag the user's thumb up or down to reorient the image 302 in 90 degrees (not shown). In another exemplary implementation, the user may drag the user's thumb to form a substantially right angle shape to rotate the image 302 in 180 degrees (not shown). Thus, as the user drags the thumb toward the bottom of the mobile device 100 and then right, the image 302 may rotate in 180 degrees in counterclockwise direction. Conversely, as the user drags the thumb toward the left and then up, the image 302 may rotate in 180 degrees in clockwise direction.

Figure 8A:
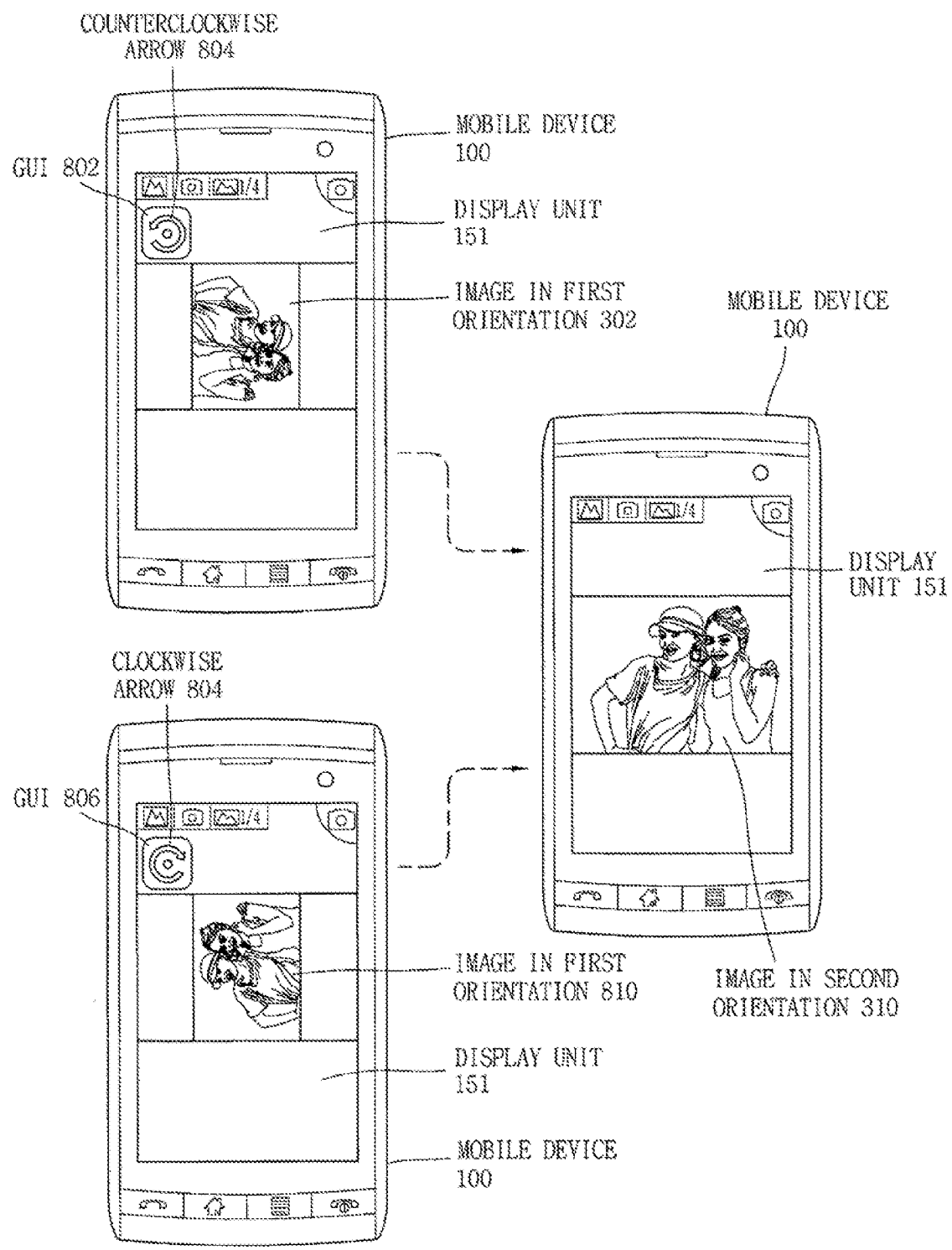
FIGS. 8A-8B illustrate the sixth exemplary view of the image being reoriented by a user input, according to one embodiment.
Figure 8B:
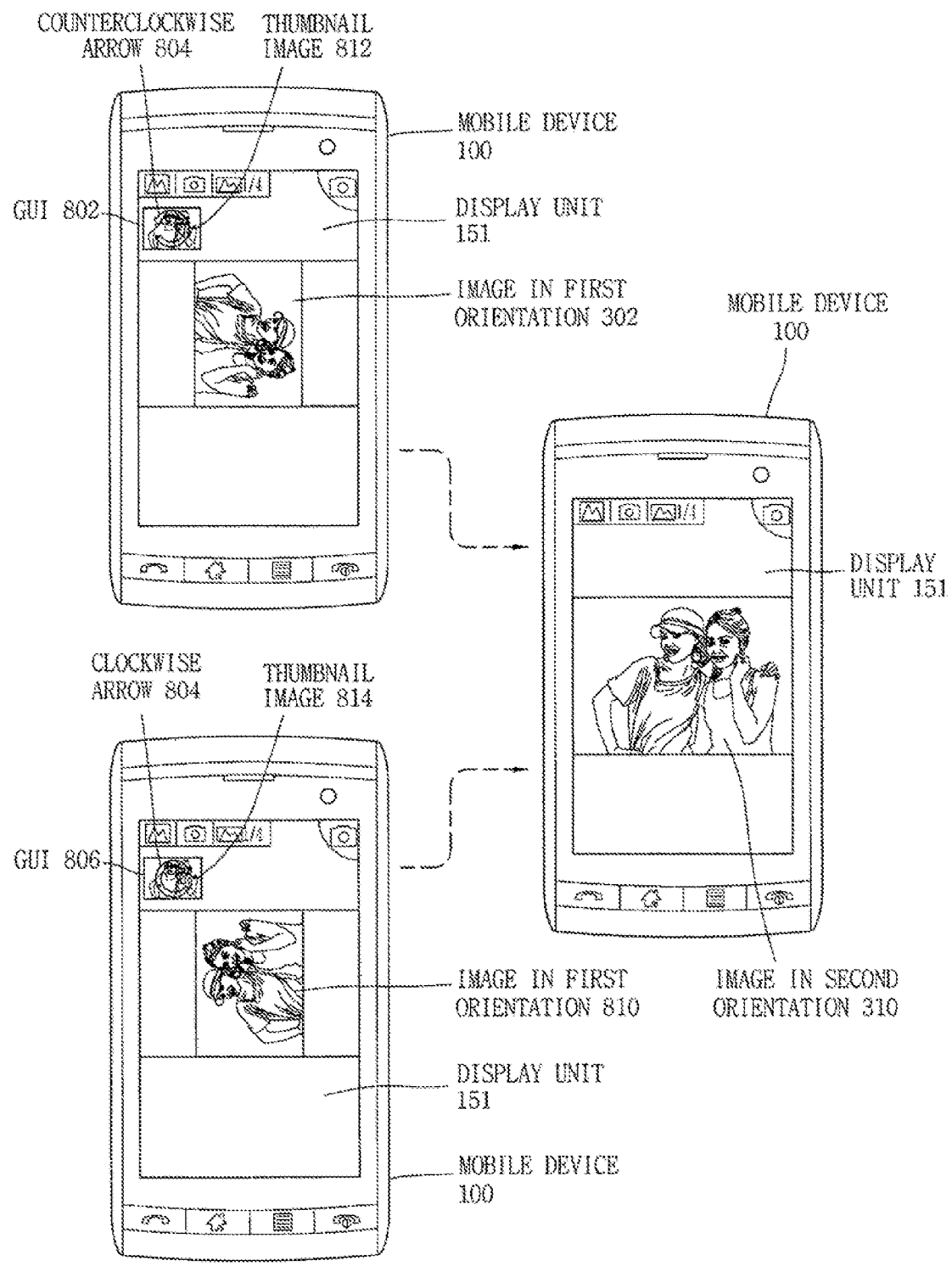

FIGS. 8A-8B illustrate the sixth exemplary view of the image 302 being reoriented by a user input, according to one embodiment. In FIG. 8A, as the image 302 or original image is displayed according to the orientation of the mobile device 100 at the time of the image capture (using the camera 204 of the mobile device 100), a UI (e.g., a circular arrow) showing the suggested reorientation for the image 302 may be displayed along with the image 302. In one embodiment, the suggested orientation for the image 302 may be determined by comparing the orientation of the mobile device 100 at the time of the image capture (e.g., which was saved as the origination tag or other type of metadata in EXIF) with the orientation of the mobile device 100 currently displaying the image 302.

For example, if the orientation of the mobile device 100 at the time of the image capture was the landscape orientation in upright position (e.g., the image 302) and the current orientation of the mobile device 100 displaying the image (e.g., the image 302) is the portrait orientation, a GUI 802 suggesting a counterclockwise reorientation (e.g., a counterclockwise arrow 804) of the image 302 is displayed, as illustrated in the top left image of the mobile device 100 in FIG. 8A. On the other hand, if the orientation of the mobile device 100 at the time of the image capture was the landscape orientation in upside down position (e.g., an image in the first orientation 810) and the current orientation of the mobile device 100 displaying the image 810 is the portrait orientation, a GUI 806 suggesting a clockwise reorientation (e.g., a clockwise arrow 808) of the image 810 is displayed, as illustrated in the bottom left image of the mobile device 100 in FIG. 8A. Subsequently, as the user accesses or activates the GUI 802 or 806, the reorientation of the image or full screen image is carried out, as illustrated at the right side in FIG. 8A.

In one embodiment, a thumbnail image of the full screen image which shows the reoriented image of the full screen image may be displayed as the background of the suggest orientation (e.g., the arrow). For example, as illustrated in FIG. 8B, a thumbnail image 812 which shows the reoriented image of the full screen image 302 is displayed as the background of the suggest orientation (e.g., the counterclockwise arrow 804). Further, a thumbnail image 814 which shows the reoriented image of the full screen image 810 is displayed as the background of the suggest orientation (e.g., the clockwise arrow 808). Subsequently, as the user accesses or activates the GUI 802 or 806, the reorientation of the image or full screen image is carried out, as illustrated at the right side in FIG. 8B.

Figure 9:
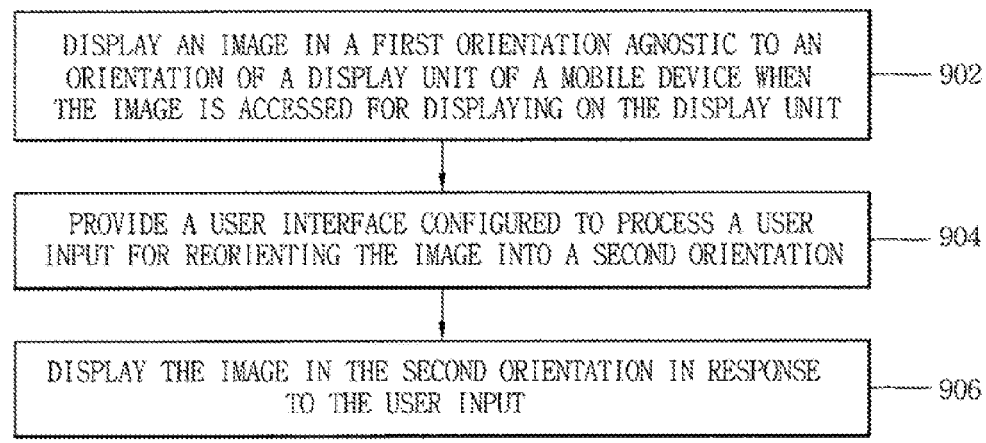
FIG. 9 illustrates a process flow chart of an exemplary method of a mobile device for displaying a captured image, according to one embodiment.

FIG. 9 illustrates a process flow chart of an exemplary method of the mobile device 100 for displaying a captured image, according to one embodiment. In keeping with the previous examples, particular components described with respect to FIGS. 1-8B are referenced as performing the process in FIG. 9. It should be noted that the components that are referred to as performing the process are for illustrative purposes only. In some implementations, other components, or a different combination of components within a system, may instead perform the process in FIG. 9.

In operation 902, as illustrated in FIGS. 1-8B, the image in the first orientation 302 in FIG. 3A is displayed irrespective of an orientation of the display unit 151 when the image is accessed for displaying on the display unit 151. It is appreciated that the first orientation is an orientation of an image capturing device (e.g., the camera 203) rendered during a capture of the image 302. In operation 904, a user interface (e.g., a GUI, a touch screen, an acceleration sensor, etc.) configured to process a user input for reorienting the image into the second orientation 310 is provided. In one embodiment, the user interface may comprise the GUI 802 or 806 indicating a suggested orientation of the image when the image in the first orientation 302 or 810 is displayed on the display unit 151.

In operation 906, the image in the second orientation 310 is displayed in response to the user input. In one embodiment, as illustrated in FIGS. 5A-5B, the thumbnail image 316 may be rotated according to a rotation of the wheel icon 318 effected by the touch 320 applied on a portion of the touch screen 308 of the mobile device 100 which corresponds to the wheel icon 318. Further, the thumbnail image 322 and the image in the second orientation 310 may be displayed on the display unit when the touch 320 is released from the wheel icon 318, as illustrated in FIG. 5C. It is appreciated that the methods disclosed in FIG. 9 may be implemented in a form of a machine-readable medium embodying a set of instructions that, when executed by a machine, cause the machine to perform any of the operations disclosed herein.

Figure 10:
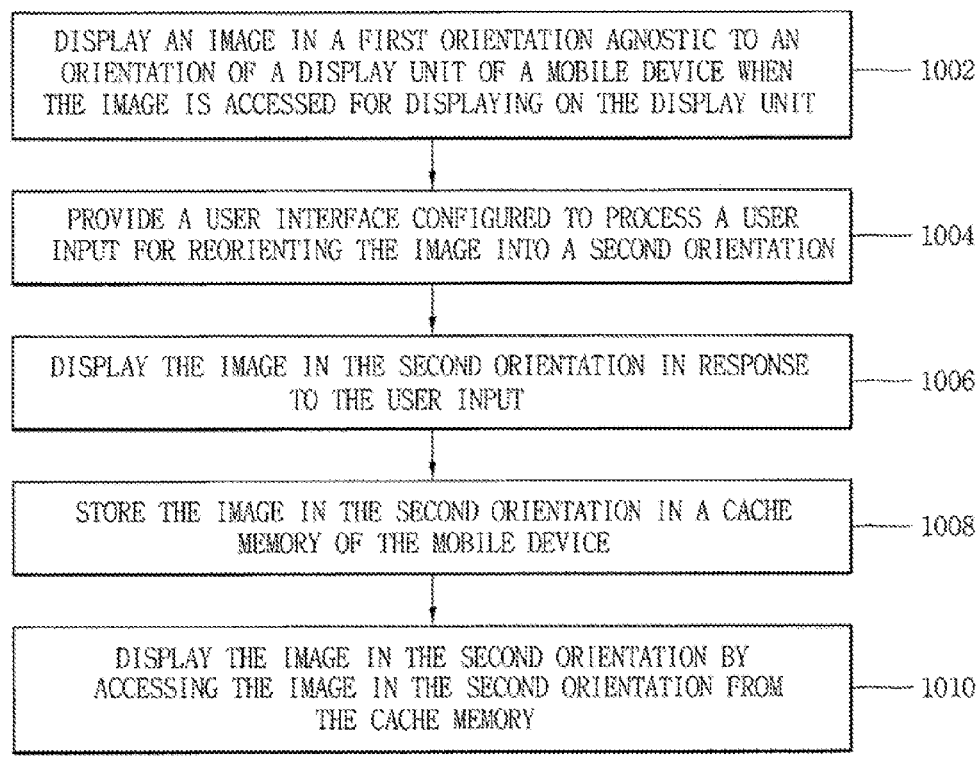
FIG. 10 illustrates a process flow chart of another exemplary method of a mobile device for displaying a captured image, according to one embodiment.

FIG. 10 illustrates a process flow chart of another exemplary method of the mobile device 100 for displaying a captured image, according to one embodiment. In keeping with the previous examples, particular components described with respect to FIG. 1-8B are referenced as performing the process in FIG. 10. It should be noted that the components that are referred to as performing the process are for illustrative purposes only. In some implementations, other components, or a different combination of components within a system, may instead perform the process in FIG. 10.

In operation 1002, the image in the first orientation 302 is displayed irrespective of an orientation of the display unit 151 when the image is accessed for displaying on the display unit 151, where the first orientation is an orientation of an image capturing device rendered during a capture of the image 302. In operation 1004, a user interface configured to process a user input for reorienting the image 302 into a second orientation is generated. In operation 1006, the image in the second orientation 310 is displayed in response to the user input. In operation 1008, the image in the second orientation 310 is stored in the cache memory. In operation 1010, the image in the second orientation 310 is displayed by accessing the image in the second orientation 310 from the cache memory in response to a subsequent user input accessing the image. It is appreciated that the methods disclosed in FIG. 10 may be implemented in a form of a machine-readable medium embodying a set of instructions that, when executed by a machine, cause the machine to perform any of the operations disclosed herein.

The various devices, modules, analyzers, generators, etc. described herein may be enabled and operated using hardware circuitry (e.g., complementary metal-oxide-semiconductor (CMOS) based logic circuitry), firmware, software and/or any combination of hardware, firmware, and/or software (e.g., embodied in a machine readable medium). Further, the various electrical structure and methods may be embodied using transistors, logic gates, and/or electrical circuits (e.g., application specific integrated circuit (ASIC)). Although the present embodiments have been described with reference to specific example embodiments, it will be evident that various modifications and changes may be made to these embodiments without departing from the broader spirit and scope of the various embodiments.

What is claimed is:

1. A mobile device, comprising:
   a memory;
   a display unit;
   an input device; and
   a processor coupled to the memory, the display unit and the input device, the processor configured to:
   display an image in a first orientation irrespective of an orientation of the display unit when the image is accessed for displaying on the display unit, wherein the first orientation is an orientation of an image capturing device rendered during a capture of the image;
   provide a user interface configured to process a user input for reorienting the image into a second orientation by displaying a thumbnail image of the image and a graphical user interface in a shape of a wheel surrounding the thumbnail image and rotating the thumbnail image to the second orientation when the user input is applied to the graphical user interface in the shape of the wheel to a degree of rotation corresponding to the second orientation; and
   display the image in the second orientation in response to the user input by reorienting the image in the second orientation when the user input applied to the graphical user interface in the shape of the wheel is released.

2. The mobile device of claim 1, wherein the image is a full screen image or a thumbnail image.

3. The mobile device of claim 1, wherein the image capturing device comprises a camera device.

4. The mobile device of claim 1, further comprising a touch screen configured to sense the user input applied on the touch screen.

5. The mobile device of claim 1, further comprising an acceleration sensor configured to determine a location of the user input applied on a housing of the mobile device in a form of tapping.

6. The mobile device of claim 5, wherein the processor is further configured to set the second orientation rotated clockwise ninety degrees from the first orientation when a left side of the housing is tapped, and to set the second orientation rotated counterclockwise ninety degrees from the first orientation when a right side of the housing is tapped.

7. The mobile device of claim 4, wherein the image in the first orientation is rotated to the image in the second orientation when a portion of the touch screen at an edge of the image in the first orientation is dragged.

8. The mobile device of claim 4, wherein the image in the first orientation is rotated 180 degrees in response to a dragging on the touch screen in a substantially right angular shape.

9. The mobile device of claim 4, wherein the user interface comprises a second graphical user interface comprising a suggested orientation of the image when the image in the first orientation is displayed on the display unit.

10. The mobile device of claim 9, wherein the suggested orientation of the image is a current orientation of the mobile device.

11. The mobile device of claim 9, wherein the second graphical user interface comprising the suggested orientation of the image further comprises an arrow indicating a suggested rotation of the image.

12. The mobile device of claim 11, wherein the second graphical user interface further comprises a thumbnail image indicating a subsequent orientation of the image according to the suggested rotation of the image.

13. A method of a mobile device, the method comprising:
   displaying an image in a first orientation irrespective of an orientation of a display unit of the mobile device when the image is accessed for displaying on the display unit, wherein the first orientation is an orientation of an image capturing device associated with the mobile device rendered during a capture of the image;
   providing a user interface configured to process a user input for reorienting the image into a second orientation by displaying a thumbnail image of the image and a graphical user interface in a shape of a wheel surrounding the thumbnail image and rotating the thumbnail image to the second orientation when the user input is applied to the graphical user interface in the shape of the wheel to a degree of rotation corresponding to the second orientation; and
   displaying the image into the second orientation in response to the user input by reorienting the image in the second orientation when the user input applied to the graphical user interface in the shape of the wheel is released.

14. The method of claim 13, wherein the providing the user interface comprises providing a second graphical user interface indicating a suggested orientation of the image when the image in the first orientation is displayed on the display unit.

15. The mobile device of claim 1, wherein the controller is further configured to:
- store the image in the second orientation in a cache memory; and
- display the image in the second orientation by accessing the image in the second orientation from the cache memory in response to a subsequent user input accessing the image.

16. The mobile device of claim 1, wherein the image is rotated along with the rotating of the thumbnail image to the second orientation in response to the user input.

17. The mobile device of claim 1, wherein the image is not rotated while the rotating of the thumbnail image to the second orientation is performed.

* * * * *